May 28, 1957 S. J. HETZEL 2,793,958
MANUFACTURE OF CEMENT
Filed Jan. 21, 1955
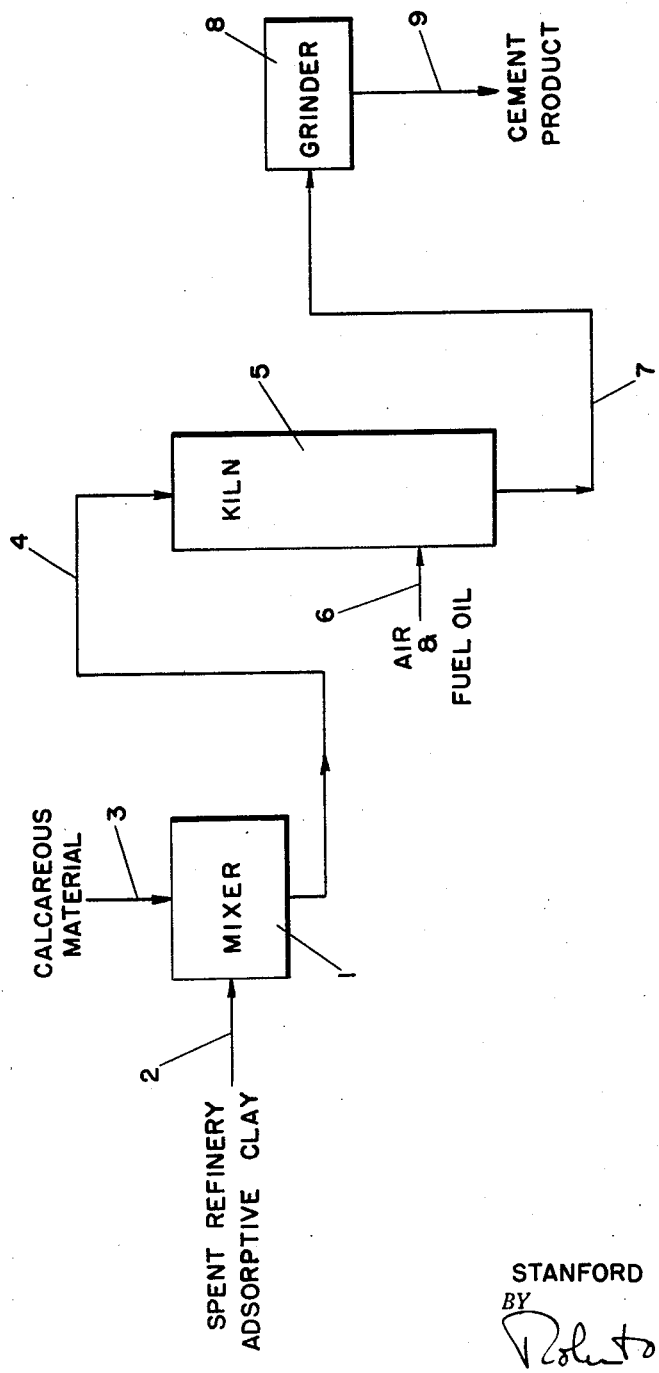
INVENTOR.
STANFORD J. HETZEL
BY
ATTORNEY

United States Patent Office 2,793,958
Patented May 28, 1957

2,793,958

MANUFACTURE OF CEMENT

Stanford J. Hetzel, Cheltenham, Pa., assignor to Sun Oil Company, Philadelphia, Pa., a corporation of New Jersey Application January 21, 1955, Serial No. 483,208

1 Claim. (Cl. 106—100)

This invention relates to a method for manufacturing Portland cement whereby petroleum refinery spent adsorptive clay is used both as a component of the final cement composition and as a source of the fuel required during the roasting of the cement clinker.

Large amounts of adsorptive clays or earths are used to refine petroleum hydrocarbon fractions such as lubricating oils or waxes. For example, adsorptive clays are used in contact filtration or percolation treatment to decolorize or deodorize petroleum hydrocarbons. After the adsorptive clays have been used to treat certain quantities of petroleum hydrocarbons, the activity of the clays for producing the desired refining effect decreases to such an extent that it is no longer economical to use the adsorptive clays in further refining procedures. These spent refinery adsorptive clays, which may contain up to about 30% of adsorbed organic material, are normally discarded as a waste product of petroleum refining. Many methods have been devised to reclaim spent clays for re-use in refinery processes or for use in other procedures but these methods in general have not proved to be economical as evidenced by the fact that spent clay disposal continues to be an important problem in petroleum refining.

It has now been found that spent refinery adsorptive clays can advantageously be used both as raw material and as fuel in the manufacture of Portland cement. According to this invention, refinery spent clay containing adsorbed organic material is admixed with calcareous material, e. g. limestone, in amount such that the inorganic portion of the resulting admixture after roasting has the composition of Portland cement. The admixture of spent clay and calcareous material is roasted at high temperatures to form cement clinker, while utilizing the combustion of organic material adsorbed on the spent clay as a source of the heat necessary for the roasting. The cement clinker is cooled and ground into very small particles before being used in any of the many applications wherein Portland cement is normally employed.

The present invention has distinct advantages over the prior art. Spent clay is a product which is normally not only valueless but also costly to dispose of. Through practice of the invention, the spent clay is used as raw material in the manufacture of a valuable product, i. e. cement, at reduced cost. The cost of the fuel necessary for roasting cement clinker is a substantial portion of the overall cost of manufacturing cement. Through utilization as fuel of the adsorbed organic matter on refinery spent clay, practice of the invention results in substantially reduced fuel costs during manufacture of the cement.

Any of the common adsorptive clays used in the refining of petroleum hydrocarbons, e. g. lubricating oils, waxes, or the like, which upon the addition thereto of certain amounts of calcareous material forms a mixture suitable as raw material for the manufacture of Portland cement, can be used in carrying out this invention. Fuller's earth, acid activated bentonites, and the like are suitable clays according to the invention. Specific examples of commercially known clay which can be used are Attapulgus clays, Special Filtrol, Super Filtrol, and the like.

These adsorptive clays are used in various refinery procedures for treating petroleum hydrocarbons until the activity of the clays diminishes to such an extent that it is no longer economical to use the clays or to revivify and re-use them. According to the present invention, the spent clay containing adsorbed organic material is intimately admixed with calcareous material in proportions such that after the roasting the inorganic portion of the resulting mixture comprises Portland cement.

Portland cement generally has a composition by weight of about 19.32% to 23.06% $SiO_2$, 4.05% to 7.59% $Al_2O_3$, 1.45% to 5.77% $Fe_2O_3$, 62.01% to 66.93% CaO, and 0.68% to 4.91% MgO.

Adsorptive clays, although containing all of the inorganic raw materials necessary for the manufacture of Portland cement, are deficient in calcium oxide or in calcium carbonate which decomposes during roasting to form calcium oxide. It is therefore necessary in practicing this invention to admix calcareous material, i. e. material comprising predominantly calcium oxide or calcium carbonate, with the spent adsorptive clay in order to make up this deficiency. It is important that the calcareous materials do not contain undesirable compounds in amount sufficient to deleteriously affect the properties of the final cement product. Suitable calcareous materials which can be used are limestone, chalk, marine shells, waste calcium carbonate from industrial processes and the like.

The admixture of spent clay and calcareous material is roasted in kilns at temperatures whereby incipient fusion of components of the mixture occurs with the formation of cement clinkers. Suitable fusion temperatures normally are in the range of about 1400° C. to 1500° C. although higher or lower temperatures can on occasion be used.

In preferred practice of the invention, the spent clay-calcareous material admixture is roasted in vertical kilns. The admixture is charged to the top of the kiln and heated air and fuel oil are charged near the bottom of the kiln. Upon passage down through the kiln, the charge admixture is heated by combustion of both the organic matter adsorbed on the spent clay and the fuel oil which is injected near the base of the kiln. Combustion conditions are regulated such that the temperature of the cement charge material reaches a maximum near the center or lower third of the kiln. The use of vertical kilns facilitates temperature control of the cement charge while utilizing the organic matter adsorbed on the spent clay as fuel. However, inclined rotary kilns can be used in carrying out the present invention. Through practice of the invention substantially reduced amounts of fuel oil are required during the roasting of the cement clinker.

The cement clinkers are cooled and ground into cement. Any of the additives known in the art such as retarding agents, air-entraining agents, dispersing agents, and the like may be incorporated in the cement. The product cement is suitable for use in any of the applications wherein Portland cement is normally used.

A specific embodiment of this invention is shown in the acompanying drawing. As seen in the drawing, spent clay and calcareous material are introduced into mixer 1 by means of lines 2 and 3 respectively. In mixer 1 the materials are intimately admixed preparatory to being charged to kiln 5.

The spent clay used can be any petroleum refinery spent adsorptive clay which when admixed with calcareous material such as limestone forms a suitable raw material admixture for manufacture of Portland cement. Suitable clays are, for example, fuller's earth, acid-activated bentonitic clays and the like. The spent clay used in this embodiment of the invention is a spent Attapulgus clay comprising about 67.5% $SiO_2$, 12.8% $Al_2O_3$, 4.5% $Fe_2O_3$, 11.1 MgO, 1.6% CaO, 0.9% $K_2O+Na_2O$, and 0.6% $TiO_2$, and also containing about 20% adsorbed organic material. The clay had been used in the clay percolation decolorization of lubricating oils until its decolorizing activity had diminished to an uneconomically low level.

The calcareous material used in this embodiment of the invention is limestone although other materials such as marine shells, waste calcium carbonate and the like can also be used.

The spent Attapulgus clay and limestone are introduced into mixer 1 in proportions such that after roasting the resulting mixture has the composition of Portland cement. In this embodiment of the invention about 350 parts by weight of limestone are added to about 100 parts by weight of spent clay (on an adsorbed organic material-free basis) to form a mixture comprising about 15.2% $SiO_2$, 2.9% $Al_2O_3$, 1.1% $Fe_2O_3$, 2.9% MgO, 0.4% CaO, 77.2% $CaCO_3$, 0.2% $K_2O+Na_2O$, and 0.1% $TiO_2$ on an organic material-free basis. The relative proportions of spent clay and calcareous material used depends upon the composition of these materials and upon the composition of the desired cement product and accordingly the relative amounts of these additive materials can vary. If desired, raw cement rock can be admixed with the spent clay and limestone in mixer 1. The addition of raw cement rock is not shown in the accompanying drawing.

After thorough mixing in mixer 1, the admixture of spent clay and limestone is passed into kiln 5 by means of line 4. Kiln 5 preferably comprises a vertical-type stationary kiln although inclined rotary kilns can also be used in practicing the invention. The charge mixture is introduced into kiln 5 at the top of the kiln as indicated schematically in the drawing. Air which preferably has been preheated and fuel oil are introduced into kiln 5 through line 6 near the base of the kiln. As the charge material moves downwardly through kiln 5 the temperature gradually increases as a result of the combustion of the adsorbed organic material contained in the charge and the combustion of the added fuel oil. The temperature reaches a maximum of about 1400° C. to 1500° C. near the center or in the lower portion of the kiln, whereby fusion of the charge materials occurs. After reaching the maximum temperature, the materials are gradually cooled in the lowest portion of the kiln and fused cement clinkers are withdrawn from the kiln at the bottom. The clinkers are further cooled (not shown) and sent to grinder 8 through line 7. In grinder 8, the cement clinkers are pulverized and the finished cement product is withdrawn through line 9. The finished cement product of this embodiment of the invention has a composition of about 23.0% $SiO_2$, 4.4% $Al_2O_3$, 1.7% $Fe_2O_3$, 4.4% MgO, 66.0% CaO, 0.3% $K_2O+Na_2O$, and 0.2% $TiO_2$.

Normally about 5 to 8 gallons of fuel oil are needed to supply the necessary heat for roasting 1 barrel of cement. According to the present invention, this fuel oil requirement can be reduced by one third or more through the utilization of the adsorbed organic material on spent clay as roasting fuel. The price of the raw materials for the cement is also substantially reduced through the utilization of the normally valueless spent refinery clay while the quality of the product produced according to the invention is equivalent to that made by conventional practices.

The invention claimed is:

Process for the preparation of Portland cement which comprises contacting an adsorptive clay with a petroleum hydrocarbon fraction whereby organic constituents of said fraction are adsorbed by said clay, continuing said contacting until the activity of said clay for adsorbing components of said fraction is substantially decreased, separating the spent clay containing about 30% adsorbed organic material from said fraction, admixing said separated spent slay with calcium carbonate containing material in proportions such that the inorganic portion of the resulting admixture after roasting has a composition by weight in the following range:

19.32% to 23.06% $SiO_2$
4.05% to 7.59% $Al_2O_3$
1.45% to 5.77% $Fe_2O_3$
62.01% to 66.93% CaO
0.68% to 4.91% MgO and roasting said admixture at temperatures in the range of about 1400° C. to 1500° C. to form cement clinkers, while utilizing as a source of the heat for said roasting the heat liberated through combustion of the organic material adsorbed on the spent clay.

References Cited in the file of this patent

UNITED STATES PATENTS

| | | |
|---|---|---|
| 154,641 | Brown et al. | Sept. 1, 1874 |
| 195,749 | Dunderdale | Oct. 2, 1877 |
| 1,520,493 | Wilson | Dec. 23, 1924 |
| 1,755,638 | Evans | Apr. 22, 1930 |